United States Patent
Wang

(10) Patent No.: US 12,470,345 B2
(45) Date of Patent: Nov. 11, 2025

(54) METHOD FOR DOWNLINK CONTROL INFORMATION DESIGN, ELECTRONIC DEVICE, AND STORAGE MEDIUM

(71) Applicant: BEIJING UNISOC COMMUNICATIONS TECHNOLOGY CO., LTD., Beijing (CN)

(72) Inventor: Hualei Wang, Beijing (CN)

(73) Assignee: BEIJING UNISOC COMMUNICATIONS TECHNOLOGY CO., LTD., Beijing (CN)

(*) Notice: Subject to any disclaimer, the term of this patent is extended or adjusted under 35 U.S.C. 154(b) by 444 days.

(21) Appl. No.: 17/799,035

(22) PCT Filed: Feb. 5, 2021

(86) PCT No.: PCT/CN2021/075652
§ 371 (c)(1),
(2) Date: Aug. 11, 2022

(87) PCT Pub. No.: WO2021/160048
PCT Pub. Date: Aug. 19, 2021

(65) Prior Publication Data
US 2023/0081467 A1 Mar. 16, 2023

(30) Foreign Application Priority Data
Feb. 14, 2020 (CN) .......................... 202010093483.X

(51) Int. Cl.
*H04L 5/00* (2006.01)

(52) U.S. Cl.
CPC .................................. *H04L 5/0051* (2013.01)

(58) Field of Classification Search
CPC ..................................................... H04L 1/1812
See application file for complete search history.

(56) References Cited

U.S. PATENT DOCUMENTS

| | | |
|---|---|---|
| 2020/0007296 A1 | 1/2020 | Papasakellariou |
| 2020/0014444 A1* | 1/2020 | Mueck ............... H04B 7/0408 |
| 2020/0221485 A1* | 7/2020 | Cirik .................. H04L 25/0224 |
| 2021/0136741 A1* | 5/2021 | Onggosanusi ........ H04W 72/23 |
| 2021/0152235 A1* | 5/2021 | Zhou ..................... H04W 72/53 |

FOREIGN PATENT DOCUMENTS

| | | |
|---|---|---|
| CN | 109076364 A | 12/2018 |
| CN | 110351052 A | 10/2019 |
| CN | 110366250 A | 10/2019 |

(Continued)

OTHER PUBLICATIONS

Vivo, Draft 38.214 CR on beam management, 3GPP TSG-RAN WG1 Meeting #95, R1-1812285, Nov. 11, 2018.

(Continued)

*Primary Examiner* — Pamit Kaur
(74) *Attorney, Agent, or Firm* — HAUPTMAN HAM, LLP

(57) ABSTRACT

The disclosure discloses a method for downlink control information (DCI) design, an electronic device, and a storage medium. The method for design includes: configuring transmission configuration indicator (TCI) state information of a control channel through a DCI.

18 Claims, 3 Drawing Sheets

(56) References Cited

FOREIGN PATENT DOCUMENTS

| | | |
|---|---|---|
| CN | 110535571 A | 12/2019 |
| CN | 110661594 A | 1/2020 |

OTHER PUBLICATIONS

Vivo, Discussion on eMIMO features, 3GPP TSG RAN WG1 #99, R1-1912043, Nov. 8, 2019.
Intel Corporation, Discussion on TCI state switching requirements, 3GPP TSG-RAN WG4 Meeting #91, R4-1905705, May 13, 2019.
The partial supplementary European search report issued in corresponding EP application No. 21753015.3 dated Feb. 23, 2024.
Ericsson, On active TCI state switching, 3GPP TSG-RAN WG4 Meeting #93, R4-1915246, Nov. 18-22, 2019.
The extended European search report issued in corresponding EP application No. 21753015.3 dated Jun. 10, 2024.
Huawei et al., Enhancements on Multi-TRP/panel transmission, 3GPP TSG RAN WG1 Meeting #96bis, R1-1903970, Apr. 12, 2019.
WIPO, International Search Report and Written Opinion for International Application No. PCT/CN2021/075652, Aug. 19, 2021.
VIVO, Further discussion on Multi-Beam Operation, 3GPP TSG RAN WG1 #98, R1-1908167, Aug. 26, 2019.
The first office action issued in corresponding CN application No. 202010093483.X dated Jun. 22, 2022.

* cited by examiner

METHOD FOR DOWNLINK CONTROL INFORMATION DESIGN, ELECTRONIC DEVICE, AND STORAGE MEDIUM

CROSS-REFERENCE TO RELATED APPLICATION(S)

This application is a National Stage of International Application No. PCT/CN2021/075652, field Feb. 5, 2021, which claims priority to Chinese Patent Application No. 202010093483.X, filed Feb. 14, 2020, the disclosures of which are hereby incorporated by reference in their entirety.

TECHNICAL FIELD

The disclosure relates to the technical field of wireless communication, and in particular, to a method for downlink control information (DCI) design, an electronic device, and a storage medium.

BACKGROUND

At present, transmission configuration indicator (TCI) state information of a control channel is obtained according to a TCI state of a control resource set (CORESET) associated with the control channel. TCI state information of the CORESET is configured through radio resource control (RRC) or through the RRC and a medium access control (MAC) control element (CE). Specifically, when the CORESET is configured through the RRC, a list of candidate TCI states may be configured through the RRC. If only one TCI state is configured through the RRC, the MAC CE is not required for configuration. If more than one TCI state is configured through the RRC, the MAC CE is required for selection and configuration of a TCI state from these TCI states.

However, in a related protocol, a configuration manner of the TCI state of the CORESET through the RRC or through the RRC and the MAC CE is likely to cause a problem of large delay and the like.

SUMMARY

The disclosure provides a method for DCI design. The method includes: configuring TCI state information of a control channel through a DCI.

The disclosure also provides an electronic device. The electronic device includes a memory configured to store computer programs and a processor configured to invoke and execute the computer programs stored in the memory to: configure TCI state information of a control channel through a DCI.

The disclosure also provides a computer-readable storage medium storing computer programs which, when executed by an electronic device, are configured to cause the electronic device to: configure TCI state information of a control channel through a DCI.

DETAILED DESCRIPTION

The disclosure is further described below in embodiments, but the disclosure is not limited to the scope of described embodiments.

A method for DCI design in embodiments includes the following.

S101. Configure TCI state information of a control channel through a DCI, which specifically includes indicating or updating the TCI state information of the control channel through the DCI.

Figure 1:
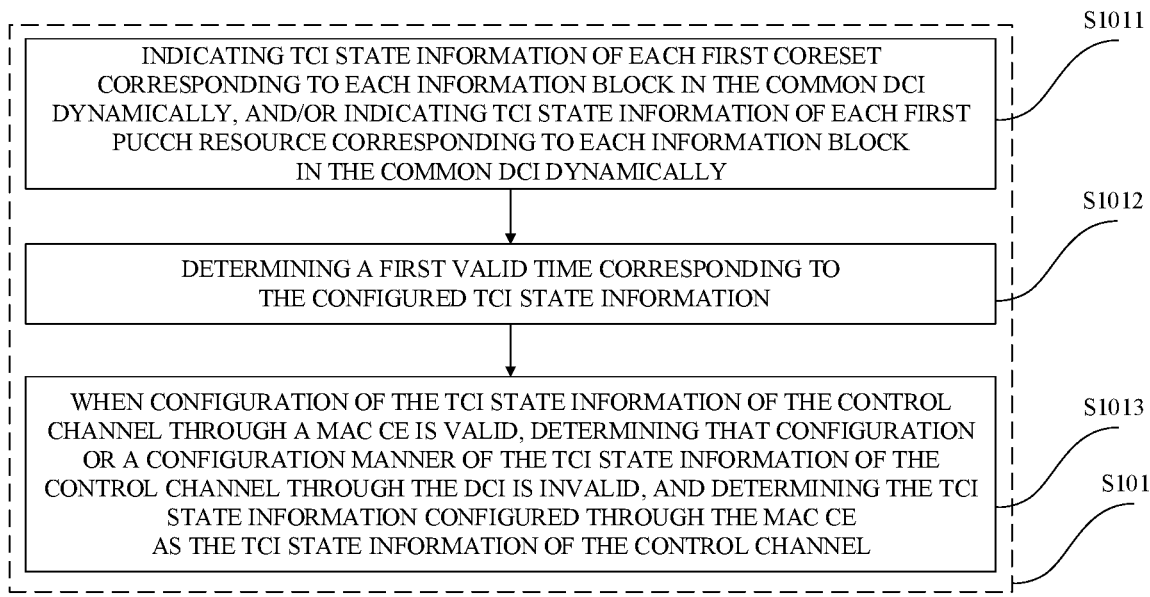
FIG. 1 is a flowchart of a method for DCI design according to embodiments of the disclosure.

Specifically, as illustrated in FIG. 1, when the DCI is a common DCI, S101 includes the following.

S1011. Indicate TCI state information of each first CORESET corresponding to each information block in the common DCI dynamically, and/or indicate TCI state information of each first PUCCH resource corresponding to each information block in the common DCI dynamically, where each UE corresponds to one information block.

S1012. Determine a first valid time corresponding to the configured TCI state information, where the first valid time is calculated according to a time slot in which a PDCCH is received and a predefined time sequence.

S1013. When configuration of the TCI state information of the control channel through a MAC CE is valid, determine that configuration or a configuration manner of the TCI state information of the control channel through the DCI is invalid, and determine the TCI state information configured through the MAC CE as the TCI state information of the control channel.

The following is a further explanation in combination with an actual configuration.

Example 1: The DCI includes block 1, block 2, . . . , block i, where block i is for user j, i and j are natural numbers, and block i=[TCI for CORESET0, TCI for CORESET1, . . . ].

The common DCI includes multiple information blocks, and each information block corresponds to a user and multiple CORESETs. Specifically, each information block contains TCI information in some or all of the CORESETs allocated to the user.

The number of information blocks corresponding to the common DCI and the number of CORESETs corresponding to each information block are preset through network configuration, and can also be adjusted according to an actual situation.

Example 2: The DCI includes block 1, block 2, . . . , block i, where block i is for user j, i and j are natural numbers, and block i=[TCI for PUCCH0, TCI for PUCCH1, . . . ].

The common DCI includes multiple information blocks, and each information block corresponds to a user and multiple PUCCH resources or PUCCH resource groups. Specifically, each information block contains TCI information in some or all of the PUCCH resources/resource groups allocated to the user.

The number of information blocks corresponding to the common DCI and the number of PUCCH resources/resource groups corresponding to each information block are preset through network configuration, and can also be adjusted according to an actual situation.

The configured TCI state has a valid time t=n+k, where n represents an index of the time slot of the PDCCH, and k represents the predefined time sequence, which is preconfigured by the network and can also be adjusted according to an actual situation. For example, k represents a length of time, such as a gap.

In addition, once the configuration of the TCI state information of the control channel through the MAC CE is valid, the configuration or the configuration manner of the TCI state information of the control channel through the DCI is invalid, and the TCI state information configured through the MAC CE is used as the TCI state information of the control channel.

In embodiments, the TCI state information of the control channel is configured through the common DCI, thereby solving a problem that a related protocol does not support indicating TCI state information of a CORESET and/or a PUCCH resource through a DCI, overcoming a problem of large delay of a related configuration manner, and improving efficiency, practicability, and effectiveness of configuration.

A method for DCI design in embodiments includes the following.

S101. Configure TCI state information of a control channel through a DCI, which specifically includes indicating or updating the TCI state information of the control channel through the DCI.

Figure 2:
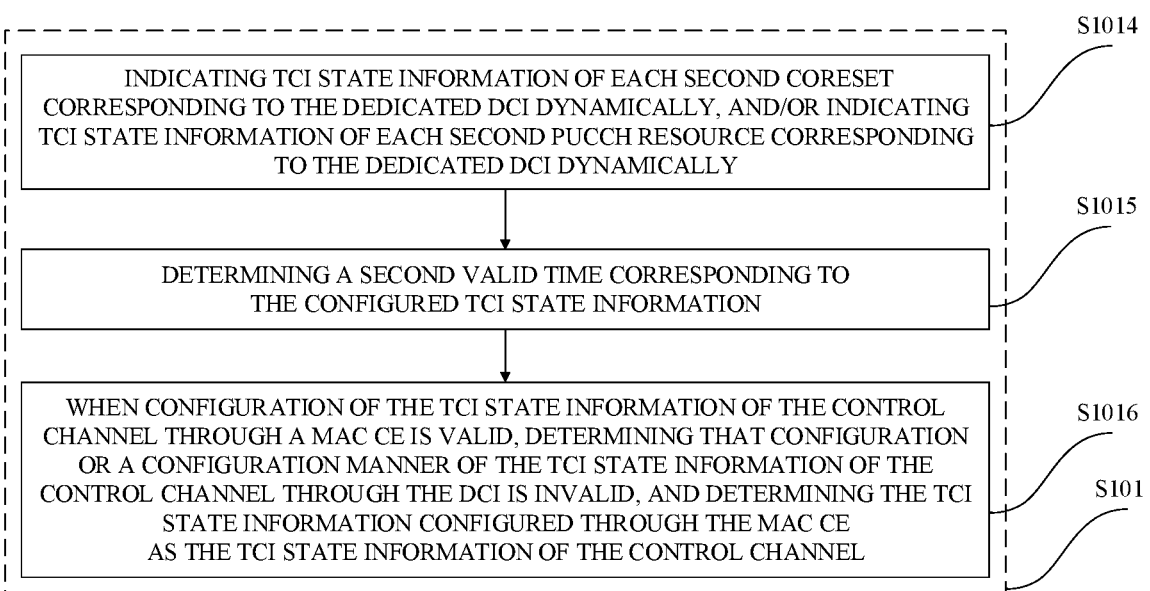
FIG. 2 is a flowchart of a method for DCI design according to embodiments of the disclosure.

Specifically, as illustrated in FIG. 2, when the DCI is a dedicated DCI, S101 includes the following.

S1014. Indicate TCI state information of each second CORESET corresponding to the dedicated DCI dynamically, and/or indicate TCI state information of each second PUCCH resource corresponding to the dedicated DCI dynamically, where the dedicated DCI corresponds to a certain UE.

S1015. Determine a second valid time corresponding to the configured TCI state information, where the second valid time is calculated according to a time slot in which a PDCCH is received and a predefined time sequence, or the second valid time is a time when the UE transmits a feedback signal to a network-side device.

The feedback signal includes but is not limited to HARQ-ACK feedback information generated by the UE based on the received DCI.

Optionally, regardless of the definition of the second valid time, there is a feedback signal, and an applicable scenario of the feedback signal is not limited in this embodiment.

S1016. When configuration of the TCI state information of the control channel through a MAC CE is valid, determine that configuration or a configuration manner of the TCI state information of the control channel through the DCI is invalid, and determine the TCI state information configured through the MAC CE as the TCI state information of the control channel.

The following is a further explanation in combination with an actual configuration.

Example 1: The DCI includes TCI for CORESET 0, TCI for CORESET 1, . . . TCI for CORESET M.

The dedicated DCI corresponds to multiple CORESETs, the number of CORESETs allocated to the terminal is M+1, and M is a natural number.

The number of CORESETs corresponding to the dedicated DCI is preset through network configuration, and can also be adjusted according to an actual situation.

Example 2: The DCI includes TCI for PUCCH 0, TCI for PUCCH 1, . . . TCI for PUCCH N.

The dedicated DCI corresponds to multiple PUCCH resources or PUCCH resource groups, the number of PUCCH resources or PUCCH resource groups allocated to the terminal is N+1, and N is a natural number.

The number of PUCCH resources or PUCCH resource groups corresponding to the dedicated DCI is preset through network configuration, and can also be adjusted according to an actual situation.

The configured TCI state has a valid time t=n+k, where n represents an index of the time slot of the PDCCH, and k represents the predefined time sequence, which is preconfigured by the network and can also be adjusted according to an actual situation, for example, k represents a length of time, such as a gap, or the valid time t of the configured TCI state is a time when the UE transmits an ACK/NACK (a feedback signal) to a network-side device.

In addition, once the configuration of the TCI state information of the control channel through the MAC CE is valid, the configuration or the configuration manner of the TCI state information of the control channel through the DCI is invalid, and the TCI state information configured through the MAC CE is used as the TCI state information of the control channel.

In this embodiment, the TCI state information of the control channel is configured through the dedicated DCI, thereby solving a problem that a related protocol does not support indicating TCI state information of a CORESET and/or a PUCCH resource through a DCI, overcoming a problem of large delay of a related configuration manner, and improving efficiency, practicability, and effectiveness of configuration.

Figure 3:
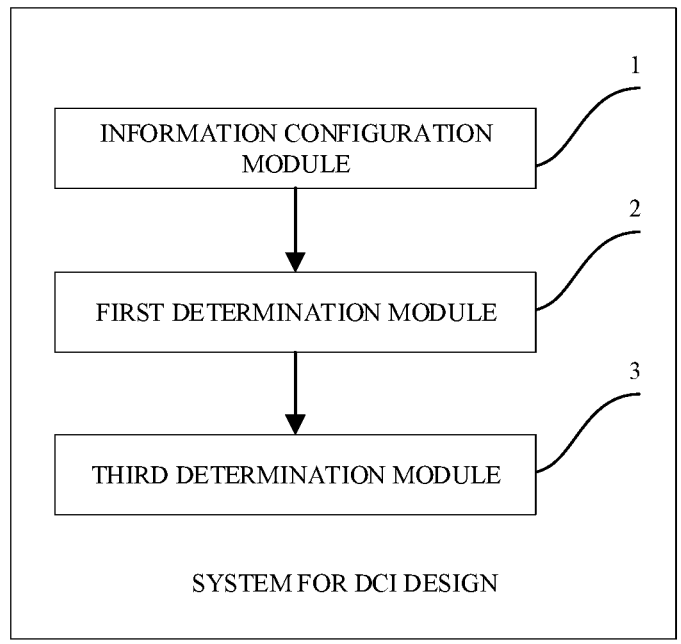
FIG. 3 is a schematic block diagram of a system for DCI design according to embodiments of the disclosure.

As illustrated in FIG. 3, a system for DCI design in embodiments includes an information configuration module 1, a first determination module 2, and a third determination module 3.

The information configuration module 1 is configured to configure TCI state information of a control channel through a DCI, which specifically includes indicating or updating the TCI state information of the control channel through the DCI.

Specifically, when the DCI is a common DCI, the information configuration module 1 is configured to indicate TCI state information of each first CORESET corresponding to each information block in the common DCI dynamically, and/or indicate TCI state information of each first PUCCH resource corresponding to each information block in the common DCI dynamically, where each UE corresponds to one information block.

The first determination module 2 is configured to determine a first valid time corresponding to the configured TCI state information, where the first valid time is calculated according to a time slot in which a PDCCH is received and a predefined time sequence.

The third determination module 3 is configured to, when configuration of the TCI state information of the control channel through a MAC CE is valid, determine that configuration or a configuration manner of the TCI state information of the control channel through the DCI is invalid, and determine the TCI state information configured through the MAC CE as the TCI state information of the control channel.

The following is a further explanation in combination with an actual configuration.

Example 1: The DCI includes block 1, block 2, . . . , block i, where block i is for user j, i and j are natural numbers, and block i=[TCI for CORESET0, TCI for CORESET1, . . . ].

The common DCI includes multiple information blocks, and each information block corresponds to a user and multiple CORESETs. Specifically, each information block contains TCI information in some or all of the CORESETs allocated to the user.

The number of information blocks corresponding to the common DCI and the number of CORESETs corresponding to each information block are preset through network configuration, and can also be adjusted according to an actual situation.

Example 2: The DCI includes block 1, block 2, . . . , block i, where block i is for user j, i and j are natural numbers, and block i=[TCI for PUCCH0, TCI for PUCCH1 . . . ,].

The common DCI includes multiple information blocks, and each information block corresponds to a user and multiple PUCCH resources or PUCCH resource groups. Specifically, each information block contains TCI information in some or all of the PUCCH resources/resource groups allocated to the user.

The number of information blocks corresponding to the common DCI and the number of PUCCH resources/resource groups corresponding to each information block are preset through network configuration, and can also be adjusted according to an actual situation.

The configured TCI state has a valid time t=n+k, where n represents an index of the time slot of the PDCCH, and k represents the predefined time sequence, which is preconfigured by the network and can also be adjusted according to an actual situation. For example, k represents a length of time, such as a gap.

In addition, once the configuration of the TCI state information of the control channel through the MAC CE is valid, the configuration or the configuration manner of the TCI state information of the control channel through the DCI is invalid, and the TCI state information configured through the MAC CE is used as the TCI state information of the control channel.

In this embodiment, the TCI state information of the control channel is configured through the common DCI, thereby solving a problem that a related protocol does not support indicating TCI state information of a CORESET and/or a PUCCH resource through a DCI, overcoming a problem of large delay of a related configuration manner, and improving efficiency, practicability, and effectiveness of configuration.

Figure 4:
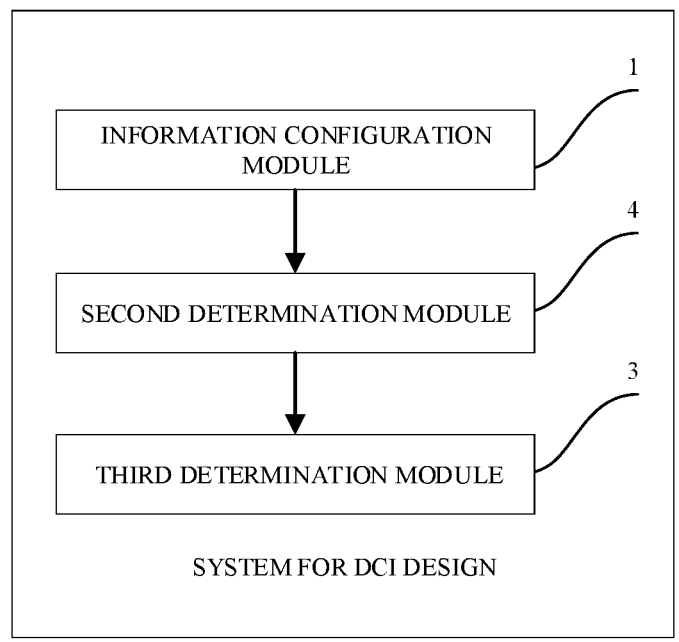
FIG. 4 is a schematic block diagram of a system for DCI design according to embodiments of the disclosure.

As illustrated in FIG. 4, a system for DCI design in embodiments includes an information configuration module 1, a second determination module 4, and a third determination module 3.

The information configuration module 1 is configured to configure TCI state information of a control channel through a DCI, which specifically includes indicating or updating the TCI state information of the control channel through the DCI.

Specifically, when the DCI is a dedicated DCI, the information configuration module 1 is configured to indicate TCI state information of each second CORESET corresponding to the dedicated DCI dynamically, and/or indicate TCI state information of each second PUCCH resource corresponding to the dedicated DCI dynamically, where the dedicated DCI corresponds to a certain UE.

The second determination module 4 is configured to determine a second valid time corresponding to the configured TCI state information, where the second valid time is calculated according to a time slot in which a PDCCH is received and a predefined time sequence, or the second valid time is a time when the UE transmits a feedback signal to a network-side device.

The feedback signal includes but is not limited to HARQ-ACK feedback information generated by the UE based on the received DCI.

Optionally, regardless of the definition of the second valid time, there is a feedback signal, and an applicable scenario of the feedback signal is not limited in this embodiment.

The third determination module 3 is configured to, when configuration of the TCI state information of the control channel through a MAC CE is valid, determine that configuration or a configuration manner of the TCI state information of the control channel through the DCI is invalid, and determine the TCI state information configured through the MAC CE as the TCI state information of the control channel.

The following is a further explanation in combination with an actual configuration.

Example 1: The DCI includes TCI for CORESET 0, TCI for CORESET 1, . . . TCI for CORESET M.

The dedicated DCI corresponds to multiple CORESETs, the number of CORESETs allocated to the terminal is M+1, and M is a natural number.

The number of CORESETs corresponding to the dedicated DCI is preset through network configuration, and can also be adjusted according to an actual situation.

Example 2: The DCI includes TCI for PUCCH 0, TCI for PUCCH 1, . . . TCI for PUCCH N.

The dedicated DCI corresponds to multiple PUCCH resources or PUCCH resource groups, the number of PUCCH resources or PUCCH resource groups allocated to the terminal is N+1, and N is a natural number.

The number of PUCCH resources or PUCCH resource groups corresponding to the dedicated DCI is preset through network configuration, and can also be adjusted according to an actual situation.

The configured TCI state has a valid time t=n+k, where n represents an index of the time slot of the PDCCH, and k represents the predefined time sequence, which is preconfigured by the network and can also be adjusted according to an actual situation, for example, k represents a length of time, such as a gap, or the valid time t of the configured TCI state is a time when the UE transmits an ACK/NACK (a feedback signal) to a network-side device.

In addition, once the configuration of the TCI state information of the control channel through the MAC CE is valid, the configuration or the configuration manner of the TCI state information of the control channel through the DCI is invalid, and the TCI state information configured through the MAC CE is used as the TCI state information of the control channel.

In this embodiment, the TCI state information of the control channel is configured through the dedicated DCI, thereby solving a problem that a related protocol does not support indicating TCI state information of a CORESET and/or a PUCCH resource through a DCI, overcoming a problem of large delay of a related configuration manner, and improving efficiency, practicability, and effectiveness of configuration.

Figure 5:
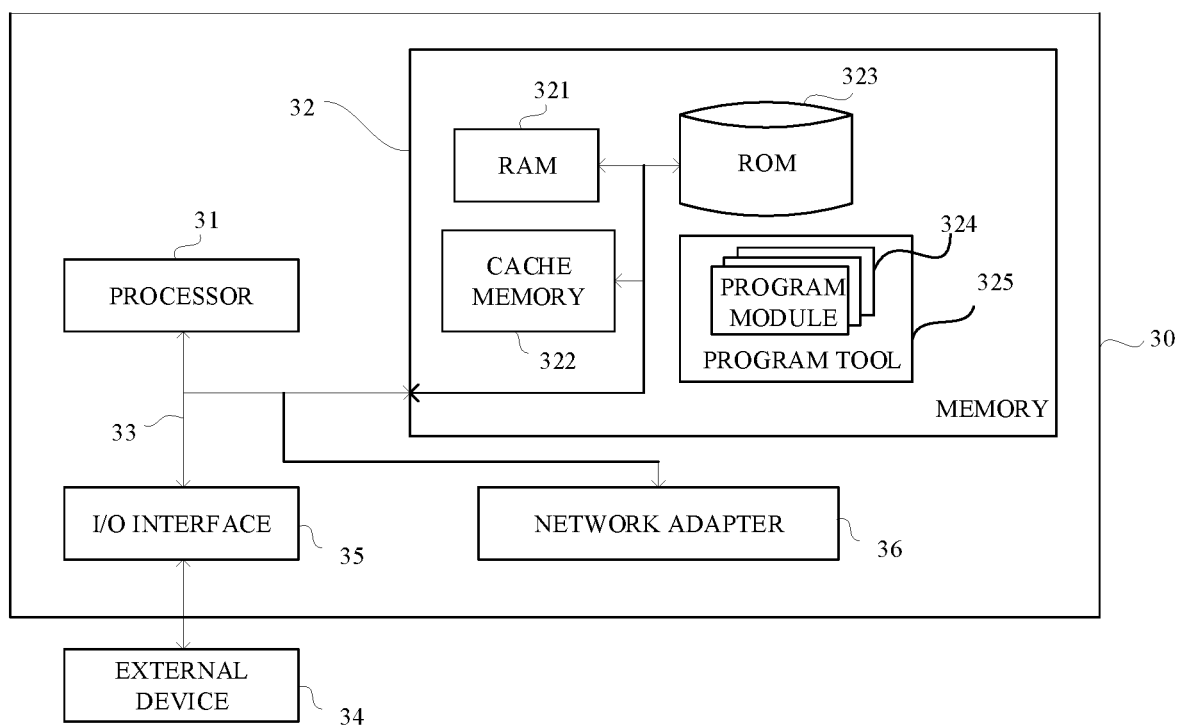
FIG. 5 is a schematic structural diagram of an electronic device for implementing a method for DCI design according to embodiments of the disclosure.

FIG. 5 is a schematic structural diagram of an electronic device provided in embodiments of the disclosure. The electronic device includes a processor and a memory configured to store computer programs executable by the processor. The computer programs, when executed by the processor, are configured to perform the method for DCI design corresponding to embodiments. The electronic device 30 illustrated in FIG. 5 is merely an example, and should not impose any limitation on the function and the range of application of embodiments of the disclosure.

As illustrated in FIG. 5, the electronic device 30 may take the form of a general-purpose computing device. For example, the electronic device 30 may be a server device. Components of the electronic device 30 may include, but are not limited to, at least one processor 31, at least one memory 32, and a bus 33 connecting different system components, including the memory 32 and the processor 31.

The bus 33 includes a data bus, an address bus, and a control bus.

The memory 32 may include a volatile memory, such as a random access memory (RAM) 321 and/or a cache memory 322, and may further include a read only memory (ROM) 323.

The memory 32 may also include a program/utility 325 having a set of (at least one) program modules 324 including, but not limited to, an operating system, one or more applications, other program modules, and program data, each or some combination of these examples may include an implementation of a network environment.

The processor 31 is configured to run a corresponding computer program stored in the memory 32 to execute various functional applications and data processing, such as the method for DCI design corresponding to embodiments of the disclosure.

The electronic device 30 may also communicate with one or more external devices 34, such as a keyboard, a pointing device, etc. Such communication may be performed through input/output (I/O) interface 35. Also, the model-generated device 30 may also communicate with one or more networks (e.g., a local area network (LAN), a wide area network (WAN), and/or a public network such as an Internet) through a network adapter 36. As illustrated in FIG. 5, the network adapter 36 communicates with other modules of the model-generated device 30 through the bus 33. It should be understood that, although not illustrated, the model-generated device 30 may be used in combination with other hardware and/or software modules, including but not limited to a microcode, a device driver, a redundant processor, an external disk drive array, a redundant array of independent disks (RAID) system, a tape drive, and a data backup storage system.

It should be noted that, although several units/modules or sub-units/sub-modules of the electronic device are mentioned above, such division is merely exemplary but not mandatory. Actually, features and functions of two or more units/modules described above may be embodied in one unit/module according to embodiments of the disclosure. Conversely, features and functions of one unit/module described above may be further subdivided to be embodied in multiple units/modules.

Embodiments provide a computer-readable storage medium storing computer programs which, when executed by a processor, are configured to perform operations of the method for DCI design of embodiments.

The readable storage medium may include, but is not limited to, a portable disk, a hard disk, a RAM, a ROM, an erasable programmable ROM, an optical storage device, a magnetic storage device, or any suitable combination thereof.

In possible implementations, the disclosure can also be implemented in the form of a program product including program codes. When the program product runs on a terminal device, the program codes are configured to cause the terminal device to perform operations of the method for DCI design of embodiments.

The program codes for executing the disclosure can be written in any combination of one or more programming languages. The program codes can be completely executed on a UE, partially executed on a UE, executed as a separate software package, partially executed on a UE and partially executed on a remote device, or completely executed on a remote device.

Although specific implementations of the disclosure are described above, those skilled in the art should understand that, this is only an illustration, and the protection scope of the disclosure is defined by the appended claims. Those skilled in the art can make various changes or modifications to these implementations without departing from the principle and essence of the disclosure, but all of these changes and modifications shall fall within the protection scope of the disclosure.

A technical problem to be solved by the disclosure is to overcome a defect that a manner of configuring TCI state information of a control channel in related art is likely to cause a large delay, and a purpose of the disclosure is to provide a method and a system for DCI design, an electronic device, and a storage media.

The disclosure solves the above-mentioned technical problem with the following technical solution.

The disclosure provides a method for DCI design. The method includes: configuring TCI state information of a control channel through a DCI.

Preferably, when the DCI is a common DCI, configuring the TCI state information of the control channel through the DCI includes: indicating TCI state information of each first CORESET corresponding to each information block in the common DCI dynamically, and/or indicating TCI state information of each first physical uplink control channel (PUCCH) resource corresponding to each information block in the common DCI dynamically, where each user equipment (UE) corresponds to one information block.

Preferably, the method for design further includes: determining a first valid time corresponding to the configured TCI state information, where the first valid time is calculated according to a time slot in which a physical downlink control channel (PDCCH) is received and a predefined time sequence.

Preferably, when the DCI is a dedicated DCI, configuring the TCI state information of the control channel through the DCI includes: indicating TCI state information of each second CORESET corresponding to the dedicated DCI dynamically, and/or indicating TCI state information of each second PUCCH resource corresponding to the dedicated DCI dynamically, where the dedicated DCI corresponds to one UE.

Preferably, the method for design further includes: determining a second valid time corresponding to the configured TCI state information, where the second valid time is calculated according to a time slot in which a PDCCH is received and a predefined time sequence, or the second valid time is a time when the UE transmits a feedback signal to a network-side device.

Preferably, the feedback signal transmitted by the UE to the network-side device includes hybrid automatic repeat request (HARQ)-acknowledgement (ACK) feedback information generated by the UE based on the received DCI.

Preferably, after configuring the TCI state information of the control channel through the DCI, the method further includes: when configuration of the TCI state information of the control channel through a MAC CE is valid, determining that configuration or a configuration manner of the TCI state information of the control channel through the DCI is invalid, and determining the TCI state information configured through the MAC CE as the TCI state information of the control channel.

The disclosure also provides a system for DCI design. The system for design includes an information configuration module. The information configuration module is configured to configure TCI state information of a control channel through a DCI.

Preferably, when the DCI is a common DCI, the information configuration module is configured to: indicate TCI state information of each first CORESET corresponding to each information block in the common DCI dynamically, and/or indicate TCI state information of each first PUCCH resource corresponding to each information block in the common DCI dynamically, where each UE corresponds to one information block.

Preferably, the system for design further includes a first determination module. The first determination module is configured to: determine a first valid time corresponding to the configured TCI state information, where the first valid time is calculated according to a time slot in which a PDCCH is received and a predefined time sequence.

Preferably, when the DCI is a dedicated DCI, the information configuration module is configured to: indicate TCI state information of each second CORESET corresponding to the dedicated DCI dynamically, and/or indicate TCI state information of each second PUCCH resource corresponding to the dedicated DCI dynamically, where the dedicated DCI corresponds to one UE.

Preferably, the system for design further includes a second determination module. The second determination module is configured to: determine a second valid time corresponding to the configured TCI state information, where the second valid time is calculated according to a time slot in which a PDCCH is received and a predefined time sequence, or the second valid time is a time when the UE transmits a feedback signal to a network-side device.

Preferably, the feedback signal transmitted by the UE to the network-side device includes HARQ-ACK feedback information generated by the UE based on the received DCI.

Preferably, the system for design further includes a third determination module. The third determination module is configured to: when configuration of the TCI state information of the control channel through a MAC CE is valid, determine that configuration or a configuration manner of the TCI state information of the control channel through the DCI is invalid, and determine the TCI state information configured through the MAC CE as the TCI state information of the control channel.

The disclosure also provides an electronic device. The electronic device includes a processor and a memory configured to store computer programs executable by the processor. The computer programs, when executed by the processor, are configured to perform the method for DCI design described above.

The disclosure also provides a computer-readable storage medium storing computer programs which, when executed by a processor, are configured to perform operations of the method for DCI design described above.

The positive advantageous effect of the disclosure is as follow.

In the disclosure, the TCI state information of the control channel is configured (indicated or updated) through the DCI, including a common DCI and/or a dedicated DCI, thereby solving a problem that a related protocol does not support indicating TCI state information of a CORESET and/or a PUCCH resource through a DCI, overcoming a problem of large delay of a related configuration manner, and improving efficiency, practicability, and effectiveness of configuration.

What is claimed is:

1. A method for downlink control information (DCI) design, comprising:
    configuring transmission configuration indicator (TCI) state information of a control channel through a DCI,
    wherein when the DCI is a common DCI, configuring the TCI state information of the control channel through the DCI comprises:
        indicating TCI state information of each first control resource set (CORESET) corresponding to each information block in the common DCI dynamically; and/or
        indicating TCI state information of each first physical uplink control channel (PUCCH) resource corresponding to each information block in the common DCI dynamically, wherein
        each user equipment (UE) corresponds to one information block; or
    wherein when the DCI is a dedicated DCI, configuring the TCI state information of the control channel through the DCI comprises:
        indicating TCI state information of each second CORESET corresponding to the dedicated DCI dynamically,
        wherein the dedicated DCI corresponds to one UE.

2. The method of claim 1, wherein when the DCI is the common DCI, and the method further comprises:
    determining a first valid time corresponding to the configured TCI state information, wherein the first valid time is calculated according to a time slot in which a physical downlink control channel (PDCCH) is received and a predefined time sequence.

3. The method of claim 2, wherein after configuring the TCI state information of the control channel through the DCI, the method further comprises:
    when configuration of the TCI state information of the control channel through a medium access control (MAC) control element (CE) is valid,
        determining that configuration or a configuration manner of the TCI state information of the control channel through the DCI is invalid; and
        determining the TCI state information configured through the MAC CE as the TCI state information of the control channel.

4. The method of claim 1, wherein when the DCI is the dedicated DCI, and the method further comprises:
    determining a second valid time corresponding to the configured TCI state information, wherein the second valid time is calculated according to a time slot in which a PDCCH is received and a predefined time sequence, or the second valid time is a time when the UE transmits a feedback signal to a network-side device.

5. The method of claim 4, wherein the feedback signal transmitted by the UE to the network-side device comprises hybrid automatic repeat request (HARQ)-acknowledgement (ACK) feedback information generated by the UE based on the received DCI.

6. The method of claim 4, wherein after configuring the TCI state information of the control channel through the DCI, the method further comprises:
    when configuration of the TCI state information of the control channel through a MAC CE is valid,
        determining that configuration or a configuration manner of the TCI state information of the control channel through the DCI is invalid; and determining the TCI state information configured through the MAC CE as the TCI state information of the control channel.

7. An electronic device, comprising:
a memory configured to store computer programs; and
a processor configured to invoke and execute the computer programs stored in the memory to:
configure transmission configuration indicator (TCI) state information of a control channel through a DCI,
wherein when the DCI is a common DCI, the processor configured to configure the TCI state information of the control channel through the DCI is configured to:
indicate TCI state information of each first control resource set (CORESET) corresponding to each information block in the common DCI dynamically; and/or
indicate TCI state information of each first physical uplink control channel (PUCCH) resource corresponding to each information block in the common DCI dynamically, wherein
each user equipment (UE) corresponds to one information block; or
wherein when the DCI is a dedicated DCI, the processor configured to configure the TCI state information of the control channel through the DCI is configured to:
indicate TCI state information of each second CORESET corresponding to the dedicated DCI dynamically,
wherein the dedicated DCI corresponds to one UE.

8. The electronic device of claim 7, wherein when the DCI is the common DCI, the processor is further configured to invoke and execute the computer programs stored in the memory to:
determine a first valid time corresponding to the configured TCI state information, wherein the first valid time is calculated according to a time slot in which a physical downlink control channel (PDCCH) is received and a predefined time sequence.

9. The electronic device of claim 7, wherein when the DCI is the dedicated DCI, the processor is further configured to invoke and execute the computer programs stored in the memory to:
determine a second valid time corresponding to the configured TCI state information, wherein the second valid time is calculated according to a time slot in which a PDCCH is received and a predefined time sequence, or the second valid time is a time when the UE transmits a feedback signal to a network-side device.

10. The electronic device of claim 9, wherein the feedback signal transmitted by the UE to the network-side device comprises hybrid automatic repeat request (HARQ)-acknowledgement (ACK) feedback information generated by the UE based on the received DCI.

11. The electronic device of claim 7, wherein when the DCI is the common DCI, the processor is further configured to invoke and execute the computer programs stored in the memory to:
when configuration of the TCI state information of the control channel through a medium access control (MAC) control element (CE) is valid,
determine that configuration or a configuration manner of the TCI state information of the control channel through the DCI is invalid; and
determine the TCI state information configured through the MAC CE as the TCI state information of the control channel.

12. The electronic device of claim 7, wherein when the DCI is the dedicated DCI, the processor is further configured to invoke and execute the computer programs stored in the memory to:
when configuration of the TCI state information of the control channel through a MAC CE is valid,
determine that configuration or a configuration manner of the TCI state information of the control channel through the DCI is invalid; and
determine the TCI state information configured through the MAC CE as the TCI state information of the control channel.

13. A non-transitory computer-readable storage medium storing computer programs which, when executed by an electronic device, are configured to cause the electronic device to:
configure transmission configuration indicator (TCI) state information of a control channel through a DCI,
wherein when the DCI is a common DCI, the computer programs causing the electronic device to configure the TCI state information of the control channel through the DCI cause the electronic device to:
indicate TCI state information of each first control resource set (CORESET) corresponding to each information block in the common DCI dynamically; and/or
indicate TCI state information of each first physical uplink control channel (PUCCH) resource corresponding to each information block in the common DCI dynamically, wherein
each user equipment (UE) corresponds to one information block; or
wherein when the DCI is a dedicated DCI, the computer programs causing the electronic device to configure the TCI state information of the control channel through the DCI cause the electronic device to:
indicate TCI state information of each second CORESET corresponding to the dedicated DCI dynamically,
wherein the dedicated DCI corresponds to one UE.

14. The non-transitory computer-readable storage medium of claim 13, wherein when the DCI is the common DCI, the computer programs are further configured to cause the electronic device to:
determine a first valid time corresponding to the configured TCI state information, wherein the first valid time is calculated according to a time slot in which a physical downlink control channel (PDCCH) is received and a predefined time sequence.

15. The non-transitory computer-readable storage medium of claim 14, wherein after configuring the TCI state information of the control channel through the DCI, the computer programs are further configured to cause the electronic device to:
when configuration of the TCI state information of the control channel through a medium access control (MAC) control element (CE) is valid,
determine that configuration or a configuration manner of the TCI state information of the control channel through the DCI is invalid; and
determine the TCI state information configured through the MAC CE as the TCI state information of the control channel.

16. The non-transitory computer-readable storage medium of claim 13, wherein when the DCI is the dedicated DCI, the computer programs are further configured to cause the electronic device to:

determine a second valid time corresponding to the configured TCI state information, wherein the second valid time is calculated according to a time slot in which a PDCCH is received and a predefined time sequence, or the second valid time is a time when the UE transmits a feedback signal to a network-side device.

17. The non-transitory computer-readable storage medium of claim 16, wherein the feedback signal transmitted by the UE to the network-side device comprises hybrid automatic repeat request (HARQ)-acknowledgement (ACK) feedback information generated by the UE based on the received DCI.

18. The non-transitory computer-readable storage medium of claim 16, wherein after configuring the TCI state information of the control channel through the DCI, the computer programs are further configured to cause the electronic device to:

when configuration of the TCI state information of the control channel through a MAC CE is valid,
determine that configuration or a configuration manner of the TCI state information of the control channel through the DCI is invalid; and
determine the TCI state information configured through the MAC CE as the TCI state information of the control channel.

* * * * *